United States Patent
Vedage et al.

(10) Patent No.: US 11,472,913 B2
(45) Date of Patent: Oct. 18, 2022

(54) MONO-ALKYLATED DIAMINES FOR EPOXY FORMULATIONS: NOVEL CURING AGENTS FOR EPOXY SYSTEMS

(71) Applicant: Evonik Operations GmbH, Essen (DE)

(72) Inventors: Gamini Ananda Vedage, Bethlehem, PA (US); Pritesh G. Patel, Breinigsville, PA (US); Jamie Schneck, Allentown, PA (US); Sebastian de Nardo, Duisburg (DE); Steffen Kanzler, Jersey City, NJ (US)

(73) Assignee: Evonik Operations GmbH, Essen (DE)

( * ) Notice: Subject to any disclaimer, the term of this patent is extended or adjusted under 35 U.S.C. 154(b) by 318 days.

(21) Appl. No.: 16/735,794

(22) Filed: Jan. 7, 2020

(65) Prior Publication Data
US 2020/0223978 A1 Jul. 16, 2020

Related U.S. Application Data

(66) Substitute for application No. 62/791,204, filed on Jan. 11, 2019.

(51) Int. Cl.
| | |
|---|---|
| C08G 59/56 | (2006.01) |
| C08G 59/50 | (2006.01) |
| C08G 59/24 | (2006.01) |
| C08L 63/00 | (2006.01) |
| C08L 63/02 | (2006.01) |
| C08G 59/22 | (2006.01) |

(52) U.S. Cl.
CPC ......... *C08G 59/5026* (2013.01); *C08G 59/22* (2013.01); *C08G 59/5033* (2013.01)

(58) Field of Classification Search
None
See application file for complete search history.

(56) References Cited

U.S. PATENT DOCUMENTS

| | | | |
|---|---|---|---|
| 2,853,467 A * | 9/1958 | Bloom | C08G 59/5033 528/120 |
| 2,890,194 A | 6/1959 | Phillips et al. | |
| 3,213,158 A | 10/1965 | Sakakibara et al. | |
| 3,285,879 A * | 11/1966 | Larson | C08G 18/325 528/64 |
| 3,634,275 A * | 1/1972 | Sundholm | C08G 59/5033 564/331 |
| 4,293,682 A | 10/1981 | Kluger et al. | |
| 5,739,209 A * | 4/1998 | Lassila | C08G 59/4042 525/113 |
| 6,403,752 B1 | 6/2002 | House et al. | |
| 7,074,963 B2 | 7/2006 | Su et al. | |
| 2008/0200283 A1 * | 8/2008 | Wu | C08G 18/10 473/374 |
| 2014/0213697 A1 | 7/2014 | Kaffee et al. | |

FOREIGN PATENT DOCUMENTS

| | | | | |
|---|---|---|---|---|
| DE | 102011113395 A1 * | 3/2013 | | C07C 215/42 |
| EP | 1403244 A2 | 3/2004 | | |
| EP | 2151463 A2 | 3/2010 | | |
| GB | 1279525 A | 6/1972 | | |
| WO | 2009089145 A1 | 7/2009 | | |
| WO | 2017175740 A1 | 10/2017 | | |

OTHER PUBLICATIONS

Machine translation of DE-102011113395-A1 (no date).*
Tanaka; Synthesis and Characteristics of Epoxides, C.A. May, ed; Epoxy Resins Chemistry and Technology; Marcel Dekker; 1988; (11 pages).
European Search Report dated Apr. 15, 2020 corresponding to EP Application No. 20150844.7 filed Jan. 9, 2020.

* cited by examiner

*Primary Examiner* — Michael J Feely
(74) *Attorney, Agent, or Firm* — Andrew H. Chung; Linda S. Li; Jason S. Ngui

(57) ABSTRACT

The present invention relates to an epoxy resin system containing an epoxy resin and a mono-alkylated diamine. The epoxy resin system can further contain a second amine. The present invention also relates to a method for producing an epoxy resin system comprising combining an epoxy resin with a mono-alkylated diamine. The mono-alkylated diamines of this invention enhance desirable processing and cured properties of epoxy resin compositions without the negative impact on mechanical properties in the cured product normally seen with cycloaliphatic amine-based curing agents.

19 Claims, 1 Drawing Sheet

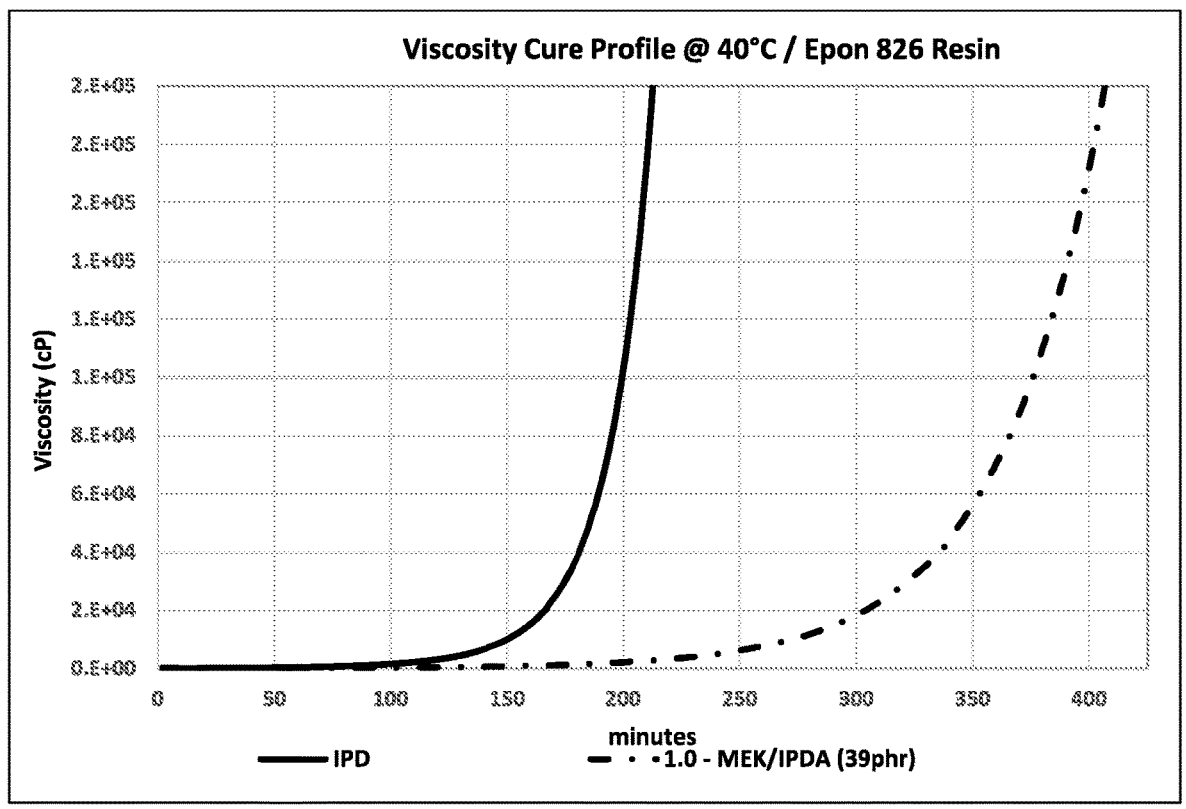

MONO-ALKYLATED DIAMINES FOR EPOXY FORMULATIONS: NOVEL CURING AGENTS FOR EPOXY SYSTEMS

BACKGROUND OF THE INVENTION

Araliphatic amines and cycloaliphatic amines are commonly used as epoxy curing agents for heat cured structural composite applications. The class of amine used as a curing agent is vital to achieve the final performance of the cured product. Each of the reactive amine classes, primary or secondary amine, is cured at a specific temperature in order to achieve full cure. The cure temperature dictates the final service temperature, which is indicated by its $T_g$. Typically, formulating epoxy resins with highly functional curing agents (hardeners) leads to short working time, high formulation viscosity and brittle parts after curing. These negative effects are all driven by the high functionality of the curing agent. It is well known that in step growth polymerization, the degree of polymerization, $X_n$, and the critical extent of reaction (gel point-$p_c$) are directly linked to the functionality of the polymerizing system: $X_n = 2/(2-pf_{ave})$ where p is the extent of reaction and $f_{ave}$ is the average functionality and $p_c = 2/f_{ave}$. Thus systems with a high average functionality will reach high molecular weights and gel at a lower degree of polymerization than those with a low average functionality. U.S. Pat. No. 4,293,682 discloses use of tetra and penta-functional amines as curing agents.

While low functionality curing agents will provide longer pot lives, these lead to final cured networks with low crosslink densities and poor thermal and mechanical properties. This inverse relationship between highly functional monomers needed for final part properties and low functionality monomers for enhanced working time requires a compromise in formulating epoxies. Some lower functionality material does not build the robust polymer network to use for structural applications. Anything that can be done to enhance working time without adversely affecting the final part properties would be advantageous. Some lower functionality material does not build the robust polymer network to use for structural applications.

Epoxy resin systems are used in the manufacturing of various structural parts, including composites. Examples of articles that are being evaluated for manufacturing from epoxy resin systems include composite pipes, pressure vessels, automotive parts and windmill blades. Fabricating such parts includes a number of requirements for effective manufacturing especially when complex manufacturing processes are used. These processes include but are not limited to resin infusion, resin transfer molding, filament winding and large casting. One need in the art is for longer working time of the epoxy resin system to wet the fibers in thicker sections of the article, since in such sections, the fabric layers are very tight under vacuum or pressure and the resin cannot easily penetrate the fabric layers. If temperatures raise during the processing of the article, under this condition viscosity of the cycloaliphatic amines will increase, fiber wetting becomes challenging, and results in mechanical property loss in the fabricated parts.

Additionally, during processing, the premature increase in viscosity may lead to higher shrinkage after the fabricated part cures. The shrinkage of a cured epoxy resin causes stresses to build up in a composite during processing due to the increase in viscosity. The stresses sometimes lead to interlaminar cracking in the article, with resultant loss of mechanical properties. The shorter pot life of the formulation increases the viscosity faster during processing of the larger parts and the greater the amount of stress that will accumulate in the article during processing.

For an advanced composite to achieve higher performance, multifunctional resins and curing agents are often used. The multifunctional materials usually have a very high starting viscosity. To reduce the formulation viscosity, heat is commonly used. This approach increases the reactivity, thus causing some handling issues. As the composite parts become larger and thicker the formulation viscosity needs to be lower to have an optimum wetting of a reinforcement (e.g. glass, carbon, Kevlar, natural fiber etc.).

Systems for composite processing require an initial mixed viscosity low enough and a rate of viscosity increase at the impregnation temperature low enough to enable the reinforcing fiber preform to be completely wet with resin before the resin system becomes too viscous for satisfactory flow through the fibers and fabric of the substrate. The requirement for low initial viscosity and long pot life becomes more stringent as the size of the composite part increases.

In light of the above, there is a need in the art for improved curing agents for producing epoxy resin systems which have longer pot life "working time" of the formulation to reduce materials replenished during the processing and when combined with improved fiber wetting leads to enhance mechanical properties when compared to the prior art resin compositions.

The Di-akylation of isophoronediamine (IPD) is known in the literature (U.S. Pat. No. 7,074,963 B2). The mono=alkylated structure of IPD is an intermediate for the Di-alkylated IPD product. The final composition of Di-alkylated IPD reported in U.S. Pat. No. 6,403,752 B1 and U.S. Pat. No. 7,074,963 B2 does not have any mono-alkylated IPD present. In this invention mono-alkylated IPD and other mono-alkylated cycloaliphatic diamines will be used as an epoxy curing agent to extend the pot life of an IPD which is not found in any prior art. In addition, the isomer type of mono-alkylated IPD product in the present invention is different than the mono-alkylated IPD suggested to make di-alkylated product in U.S. Pat. No. 7,074,963 B2. The non-alkylated (unmodified) IPD gives higher Tg and shorter pot life. The di-alkylated IPD product does not proceed to complete cure with the epoxy resin. The approach of the present invention using mono-alkylated IPD and other mono-alkylated cycloaliphatic diamines gives excellent balance of pot life while maintaining the high Tg.

BRIEF SUMMARY OF THE INVENTION

It has been discovered that mono-alkylated araliphatic and cycloaliphatic diamines, can be used as the main curing agent for epoxy resin compositions which provides adequate working time during processing (in the resin bath and fiber wetting) that overall improves the mechanical properties of the cured composite product compared to typical cycloaliphatic amine-based curing agents. The major drawback with cycloaliphatic amines is that they have short pot life. Another way the industry measures the pot life is time to double formulation viscosity. This gives a good measure of working life of the system. Using mono-alkylated cycloaliphatic diamines as the main curing agent, the 2× pot life of the cycloaliphatic diamine can be achieved and full cure at a significantly lower temperature than current cycloaliphatic amine curing agents. Test results show that using mono-alkylated cycloaliphatic diamines as the main curing agent maintains good mechanical, thermal and chemical performance in the cured epoxy composition and exceeds the mechanical properties of other cycloaliphatic amines. In addition, formulations containing mono-alkylated cycloaliphatic diamines give lower viscosity, longer pot life, low temperature $T_g$ development and lower exotherm during cure compared to cured epoxy compositions using current cycloaliphatic amine curing agents. Mono-alkylated cycloaliphatic diamines can also be used in combination with primary and secondary amines as co-curing agents to further enhance the desirable properties. The lower viscosity of mono-alkylated cycloaliphatic diamines helps in fiber wetting. Preliminary results using mono-alkylated cycloaliphatic diamines in composite applications (filament wound pipes & fittings, wind blades, high pressure vessels, structural laminates, automotive body parts, aerospace, etc.) are quite encouraging.

An aspect of the invention is an epoxy resin system comprising an epoxy resin and a mono-alkylated diamine of formula (I)

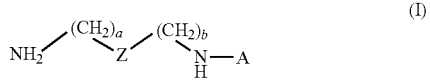
(I)

wherein Z is selected from the group consisting of cyclohexyl, $C_1$-$C_{10}$ alkyl-substituted cyclohexyl, phenyl, $C_1$-$C_{10}$ alkyl-substituted phenyl, methylenebis(cyclohexyl), and $C_1$-$C_{10}$ alkyl-substituted methylenebis(cyclohexyl), a and b individually are 0 or 1, and A is $C_1$-$C_{10}$ alkyl. The mono-alkylated diamine includes a mono-alkylated cycloaliphatic diamine or mono-alkylated araliphatic diamine selected from mono-alkylated IPD, mono-alkylated PACM, mono-alkylated DMPACM, mono-alkylated MXDA, mono-alkylated cyclohexyldiamine, and mono-alkylated methylcyclohexyldiamine.

FIG. 1 shows the viscosity profile at 40° C. for epoxy resin compositions comprising isophoronediamine (IPD) and mono alkylated isophoronediamine (AIPD).

BRIEF DESCRIPTION OF THE DRAWINGS

FIG. 1 shows the viscosity profiles at 40° C. for epoxy resin compositions comprising of non-alkylated IPD and epoxy resin compositions comprising of mono-alkylated IPD.

DEFINITIONS

The following definitions and abbreviations are provided in order to aid those skilled in the art in understanding the detailed description of the present invention.
IPD—isophoronediamine
PACM—4,4'-methylenebis(cyclohexylamine)
MXDA—m-xylylenediamine
DMPACM—2,2'-dimethyl-4,4'-methylenebis(cyclohexylamine)
Hydrogenated TDA—methylcyclohexyldiamine
CHONE—cyclohexanone
MEK—methyl ethyl ketone
ISO: isophorone

DETAILED DESCRIPTION OF THE INVENTION

The epoxy resin system of the invention comprises an epoxy resin and a mono-alkylated diamine of formula (I)

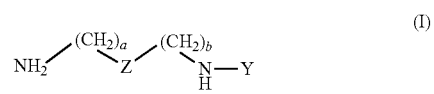
(I)

wherein Z is selected from the group consisting of cyclohexyl, $C_1$-$C_{10}$ alkyl-substituted cyclohexyl, phenyl, $C_1$-$C_{10}$ alkyl-substituted phenyl, methylenebis(cyclohexyl), and $C_1$-$C_{10}$ alkyl-substituted methylenebis(cyclohexyl), a and b individually are 0 or 1, and Y is $C_1$-$C_{10}$ alkyl.

The mono-alkylated diamine can preferably come by reaction of the corresponding diamine with acetone, methyl ethyl ketone, cyclohexanone, isophorone or aliphatic aldehydes like acetaldehyde, followed by hydrogenation or by reaction of the diamine with an alkyl halide. Therefore, Y can preferably be a cyclohexyl group, a secondary butyl group, a trimethyl cyclohexyl group, or an isopropyl group derived from the respective ketones, aldehydes and alkyl halides.

In one preferable embodiment of the invention, the mono-alkylated diamine is represented by the structure:

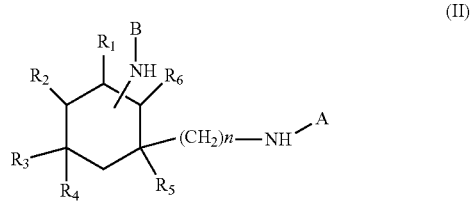
(II)

where each of $R_1$, $R_2$, $R_3$, $R_4$, $R_5$, and $R_6$ is H, $CH_3$, or a $C_2$-$C_4$ alkyl group, where n is 0 or 1, and where A is H and B is a $C_1$-$C_{10}$ alkyl or B is H and A is a $C_1$-$C_{10}$ alkyl. The mono-alkylated diamine can preferably come by reaction of the diamine with acetone, methyl ethyl ketone, cyclohexanone, isophorone or aliphatic aldehydes like acetaldehyde, followed by hydrogenation or by reaction of the diamine with an alkyl halide. Therefore, A or B can preferably be a cyclohexyl group, a secondary butyl group, a trimethyl cyclohexyl group, or an isopropyl group derived from the respective ketones, aldehydes and alkyl halides.

In a preferable embodiment of structure (II), the mono-alkylated diamine is selected from the group consisting of mono-alkylated isophoronediamine represented by the structure:

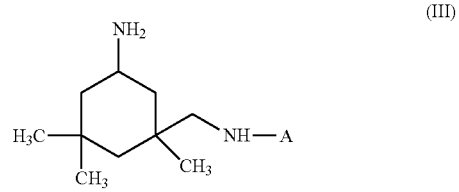
(III)

where A is a $C_1$-$C_{10}$ alkyl;

mono-alkylated isophoronediamine represented by the structure:

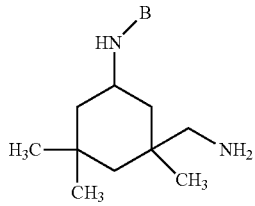

(IV)

where B is a $C_1$-$C_{10}$ alkyl;
mono-alkylated methylcyclohexyldiamine represented by the structure:

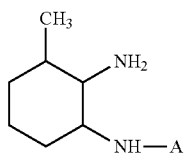

(V)

where A is a $C_1$-$C_{10}$ alkyl;
mono-alkylated methylcyclohexyldiamine represented by the structure:

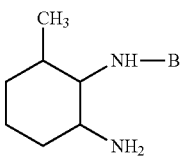

(VI)

where B is a $C_1$-$C_{10}$ alkyl; and
mono-alkylated cyclohexyldiamine represented by the structure:

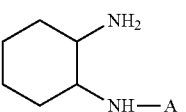

(VII)

where A is a $C_1$-$C_{10}$ alkyl.

In another preferred embodiment of the invention, the mono-alkylated diamine is represented by the structure:

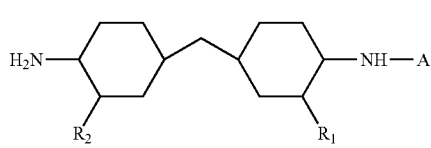

(VIII)

where each of $R_1$ and $R_2$ is H or $CH_3$, and where A is a $C_1$-$C_{10}$ alkyl. The mono-alkylated diamine can preferably come by the reaction of the diamine with acetone, methyl ethyl ketone, cyclohexanone, isophorone or aliphatic aldehydes like acetaldehyde, followed by hydrogenation or by reaction of the diamine with an alkyl halide. Therefore, A is preferably a cyclohexyl group, a secondary butyl group, a trimethyl cyclohexyl group, or an isopropyl group derived from the respective ketones, aldehydes and alkyl halides.

In a further preferred embodiment of structure (VIII), the mono-alkylated diamine is selected from the group consisting of mono-alkylated 4,4'-methylenebis(cyclohexylamine) represented by the structure:

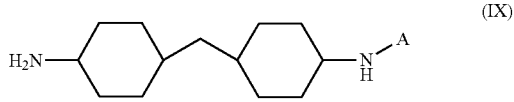

(IX)

where A is a $C_1$-$C_{10}$ alkyl; and
mono-alkylated 2,2'-dimethyl-4,4'-methylenebis(cyclohexylamine) represented by the structure:

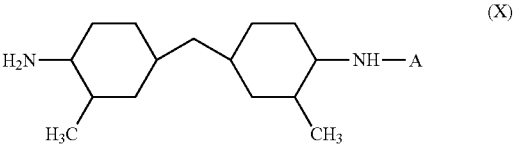

(X)

where A is a $C_1$-$C_{10}$ alkyl.

In another preferred embodiment of the invention, the mono-alkylated diamine is represented by the structure:

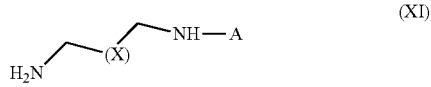

(XI)

where X is a phenyl or cyclohexyl group, and where A is a $C_1$-$C_{10}$ alkyl. The mono-alkylated diamine can preferably come by the reaction of the diamine with acetone, methyl ethyl ketone, cyclohexanone, isophorone or aliphatic aldehydes like acetaldehyde, followed by hydrogenation or by reaction of the diamine with an alkyl halide. Therefore, A can preferably be a cyclohexyl group, a secondary butyl group, a trimethyl cyclohexyl group, or an isopropyl group derived from the respective ketones, aldehydes and alkyl halides.

In one preferable embodiment of structure (XI), the mono-alkylated diamine is selected from the group consisting of mono-alkylated m-xylylenediamine represented by the structure:

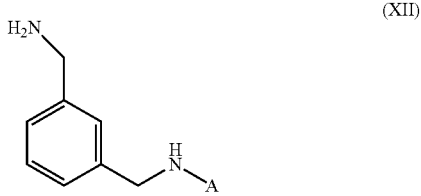

(XII)

where A is a $C_1$-$C_{10}$ alkyl; and mono-alkylated 1,3-bis aminomethylcyclohexane represented by the structure:

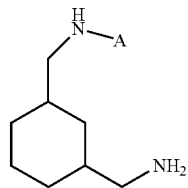

(XIII)

where A is a $C_1$-$C_{10}$ alkyl.

The epoxy resin system can comprise one or more epoxy resins. Preferably, the epoxy resin system comprises only one epoxy resin. Likewise, the epoxy resin system can comprise one or more compounds of formula (I). Preferably, the epoxy resin system comprises only one compound of formula (I).

In one embodiment, the epoxy resin system comprises 1%-99% by weight of the mono-alkylated diamine, based on the total weight of curing agents. Preferably, the epoxy resin system comprises at least 20%, more preferably at least 40%, even more preferred at least 60% and particularly preferred at least 80% by weight of the mono-alkylated diamine, based on the total weight of curing agents.

Preferably, the epoxy resin system comprises 20-100% by weight of the mono-alkylated diamine, 0-50% by weight of the non-alkylated diamine and 0-30% by weight of the dialkylated diamine, based on the total weight of curing agents.

Another aspect of the invention is a method for producing an epoxy resin system, comprising combining an epoxy resin with a mono-alkylated diamine of formula (I)

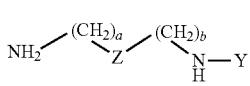

(I)

where Z is selected from the group consisting of cyclohexyl, $C_1$-$C_4$ alkyl-substituted cyclohexyl, phenyl, $C_1$-$C_4$ alkyl-substituted phenyl, methylenebis(cyclohexyl), and $C_1$-$C_4$ alkyl-substituted methylenebis(cyclohexyl), a and b individually are 0 or 1, and Y is a $C_1$-$C_{10}$ alkyl, and optionally other components.

The weight ratio of the epoxy resin to mono-alkylated diamine is preferably 1:0.05-1:0.95. In a further preferred embodiment, the weight ratio is 1:0.3-1:0.6.

The epoxy resin system can preferably further comprise a second amine. The second amine is selected from the group consisting of primary amines and secondary amines. The second amine preferably comprises one or more amine compounds selected from the group consisting of polyether amines, polyether polyamines, saturated aliphatic ring diamines, linear aliphatic amines, cycloaliphatic amines, polycycloaliphatic amines, and aromatic amines.

Preferably, the polyether amine may have the formula: $H_2NCH(CH_3)CH_2$—$[OCH_2CH(CH_3)]_xNH_2$, and x is from 2 to 70. Preferably, the second amine may comprise a mixture of 4,4'-methylene bis cyclohexylamine, isophorone diamine, 1,2-diamino cyclohexane, 4,4'-methylenebis(2-methylcyclohexyl amine), 1,3-bis aminomethyl cyclohexane and the polyether amine: $H_2NCH(CH_3)CH_2[OCH_2CH(CH_3)]_{2.5}NH_2$.

Preferably, a modified amine compound such as a Mannich base, a polyamide compound, an amine-epoxy adduct, and combinations thereof may be used as a co-curing agent for use with the mono-alkylated diamine compound as described herein.

Preferably, the epoxy resin may comprise a polyglycidyl ether of a compound selected from the group consisting of an aliphatic glycol, a cycloaliphatic glycol, a triol, a polyol, a polyglycol, and combinations thereof. The epoxy resin system may further comprise a polyacrylate or polymethacrylate ester of a polyol.

Referring to FIG. 1, the viscosity profile at 40° C. for epoxy resin compositions comprising of non-alkylated products (IPD) are compared to the viscosity profile for epoxy resin compositions comprising of mono-alkylated products. The time (min) of reactivity of the compositions is significantly increased with alkylation chemistry.

The epoxy resin can consist of a single resin, or it can be a mixture of mutually compatible epoxy resins. The epoxy resin may include, but is not limited to, bi-functional epoxies, such as, bisphenol-A and bisphenol-F resins. Multifunctional epoxy resin, as utilized herein, describes compounds containing two or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference in its entirety.

One class of epoxy resins suitable for use are the glycidyl ethers of polyhydric phenols, including the glycidyl ethers of dihydric phenols. Preferable are the glycidyl ethers of: resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol-A), bis-(4-hydroxyphenyl)-methane (commercially known as bisphenol-F, and which may contain varying amounts of 2-hydroxyphenyl isomers), and the like, or any combination thereof. Additionally, advanced dihydric phenols of the structure of formula (XIV) also are preferable in the present disclosure:

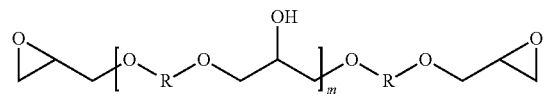

(XIV)

where m is 0 to 25, and R is a divalent hydrocarbon radical of a dihydric phenol, such as those dihydric phenols listed above.

Materials according to formula (1) can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure. In other embodiments, the epoxy resin may be a polyglycidyl amine from one or more of 2,2'-methylene dianiline, 4,4'-methylene dianiline, m-xylene dianiline, hydantoin, and isocyanate.

The epoxy resin may preferably be a cycloaliphatic (alicyclic) epoxide. Particularly preferable cycloaliphatic epoxides are diepoxides of cycloaliphatic esters of dicarboxylic acids, in particular bis(3,4-epoxycyclohexylmethyl)oxalate, bis(3,4-epoxycyclohexylmethyl)adipate, bis(3,4-epoxy-6-methylcyclohexylmethyl)adipate, vinylcyclohexene diepoxides; limonene diepoxide; bis(3,4-epoxycyclohexylmethyl) pimelate; dicyclopentadiene diepoxide; and other suitable cycloaliphatic epoxides. Other suitable diepoxides of cycloaliphatic esters of dicarboxylic acids are described, for example, in Patent Application Publication No. WO 2009/089145 A1, which is hereby incorporated by reference in its entirety.

Other particularly preferable cycloaliphatic epoxides are 3,3-epoxycyclohexylmethyl-3,4-epoxycyclohexane carboxylate, 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; and 3,4-epoxy-2-methylcyclohexyl-methyl-3,4-epoxy-3-methylcyclohexane carboxylate. Other suitable 3,4-epoxycyclohexylmethyl-3,4-epoxycyclohexane carboxylates are described, for example, in U.S. Pat. No. 2,890,194, which is hereby incorporated by reference in its entirety. In other embodiments, the epoxy resin may include polyol polyglycidyl ether from polyethylene glycol, polypropylene glycol or polytetrahydrofuran or combinations thereof.

In another aspect, epoxy novolac resins, which are the glycidyl ethers of novolac resins, can be used as multifunctional epoxy resins in accordance with the present disclosure. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weight (EEW) for such products range from about 450 to 3000 or more. Because these products are solid at room temperature, they are often referred to as solid epoxy resins.

DGEBA or advanced DGEBA resins are often used for structural formulations due to a combination of their low cost and high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also usually prepared by the advancement process, are referred to as semi-solid epoxy resins because they are a mixture of solid and liquid at room temperature. Multifunctional resins with EEW's based on solids of about 160 to about 750 are useful in the present disclosure. In another aspect, the multifunctional epoxy resin has an EEW in a range from about 170 to about 250.

Depending upon the end-use application, it can be beneficial to reduce the viscosity of the compositions of the present disclosure by modifying the epoxy resin. The epoxy resin, which comprises at least one multifunctional epoxy resin, may further comprise a monofunctional epoxide. Preferable examples of monoepoxides include, but are not limited to, styrene oxide, cyclohexene oxide and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof.

Curing Agent

As noted above, the curing agent is a mono-alkylated diamine of formula (I). The curing agent can further comprise a second amine. The second amine can consist of a single amine or a mixture of amines. The amines in the second amine are primary or secondary amines.

In some applications, the following are suitable as the second amine: a polyether diamine, a saturated aliphatic ring diamine, a linear aliphatic amine, a cycloaliphatic diamine, a polycycloaliphatic amine, an aromatic amine, and combinations thereof. The weight ratio of the epoxy resin to mono-alkylated diamine and second amine is preferably 1:0.95:0.05. In another embodiment, the weight ratio is preferably 1:0.05:0.95. Polyamines can preferably be selected from one or more of an aliphatic polyamine such as diethylenetriamine (DETA), triethylenetetramine (TETA), tetraethylenepentamine (TEPA), pentaethylenehexamine (PEHA), hexamethylenediamine (HMDA), N-(2-aminoethyl)-1,3-propanediamine ($N_3$-Amine), N, N'-1,2-ethanediylbis-1,3-propanediamine ($N_4$-amine), or dipropylenetriamine; an arylaliphatic polyamine such as m-xylylenediamine (mXDA), or p-xylylenediamine; a cycloaliphatic polyamine such as 1,3-bis aminomethyl cyclohexane (1,3-BAC), isophorone diamine (IPDA), 4,4'-methylene bis cyclohexylamine (PACM), 1,2-diamino cyclohexane, or 4,4'-methylenebis-(2-methyl-cyclohexylamine); an aromatic polyamine such as m-phenylenediamine, diaminodiphenylmethane (DDM), or diaminodiphenylsulfone (DDS); a heterocyclic polyamine such as N-aminoethylpiperazine (NAEP), or 3,9-bis(3-aminopropyl)2,4,8,10-tetraoxaspiro (5,5)undecane; a polyalkoxypolyamine where the alkoxy group can be an oxyethylene, oxypropylene, oxy-1,2-butylene, oxy-1,4-butylene or copolymers thereof such as 4,7-dioxadecane-1,10-diamine, 1-propanamine,3,3'-(oxybis(2,1-ethanediyloxy)) bis(diaminopropylated diethylene glycol ANCAMINE® 1922A), poly(oxy(methyl-1,2-ethanediyl)), alpha-(2-aminomethylethyl) omega-(2-aminomethylethoxy) (JEFFAMINE® D 230, D-400), triethyleneglycoldiamine and oligomers (JEFFAMINE® XTJ-504, JEFFAMINE® XTJ-512), poly(oxy (methyl-1,2-ethanediyl)), alpha,alpha'-(oxydi-2,1-ethanediyl)bis(omega-(aminomethylethoxy)) (JEFFAMINE® XTJ-511), bis(3-aminopropyl)polytetrahydrofuran 350, bis (3-aminopropyl)polytetrahydrofuran 750, poly(oxy(methyl-1,2-ethanediyl)), a-hydro-=w-(2-aminomethylethoxy)ether with 2-ethyl-2-(hydroxymethyl)-1,3-propanediol (3:1) (JEFFAMINE® T-403), and diaminopropyl dipropylene glycol. JEFFAMINE® is a registered trademark of Huntsman Petrochemical LLC.

Particularly suitable polyamines include isophoronediamine (IPD), 4,4'-methylene bis cyclohexylamine (PACM), 3,3'-dimethyl PACM (ANCAMINE® 2049), N-aminoethylpiperazine (NAEP), 4,7-dioxadecane-1,10-diamine,l-propanamine,3,3'-(oxybis(2,1-ethanediyloxy))bis-(ANCAMINE® 1922A), poly(oxy(methyl-1,2-ethanediyl)), alpha-(2-aminomethylethyl)omega-(2-aminomethylethoxy) (JEFFAMINE® D 230, D-400), poly(propylene glycol) bis (2-aminopropyl ether), triethylene glycol diamine (JEFFAMINE® XTJ-504), and poly(oxy(methyl-1,2-ethanediyl))alpha,alpha'-(oxy(di-2,1-ethanediyl))bis(omega-(aminomethylethoxy)) (JEFFAMINE® XTJ-511) or mixture thereof. ANCAMINE® is a registered trademark of Evonik Degussa GmbH.

Additional amines suitable for forming the second amine are polyamines comprising at least one or more multifunctional amine of structure (XV).

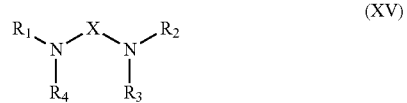

where $R_1$ is $CH_2CH_2CH_2NH_2$; $R_2$, $R_3$ and $R_4$ independently are H or $CH_2CH_2CH_2NH_2$; and X is $CH_2CH_2$ or $CH_2CH_2CH_2$. In one embodiment $R_2$ and $R_3$ are not H simultaneously.

Optional Additives

The epoxy system formulation for the composite may optionally include additives, such as, but not limited to, non-reactive plasticizer(s), filler(s), processing aid(s), stabilizer, air release agent, viscosity modifier(s), UV absorbent agent, a flame retardant, and/or an impact modifier.

The optional acrylate or methacrylate esters of the polyols are blended with the epoxy resin in a weight ratio of from 0 to up to about 100 parts of ester for each 100 parts of epoxy resin. In another embodiment, the acrylate or methacrylate esters of the polyols are blended with the epoxy resin in a weight ratio of about 5 to about 100 parts of ester for each 100 parts of epoxy resin.

Nano materials/fillers may be included. The term "nanomaterials," includes, but is not limited to, multi-wall carbon or boron nitride nanotubes, single-wall carbon, carbon or boron nitride nanoparticles, carbon or boron nitride nanofibers, carbon or boron nitride nanoropes, carbon or boron nitride nano ribbons, nanoclays; nanoclays comprising tubules; layered inorganic clay material; talc; carbon black; cellulose fibers; silica; and alumina.

The epoxy resin system of the present invention can preferably be produced by a method for producing an epoxy resin system, wherein an epoxy resin is combined with a mono-alkylated diamine of formula (I)

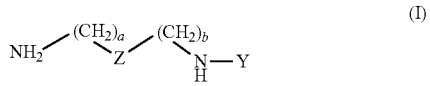

wherein Z is selected from the group consisting of cyclohexyl, $C_1$-$C_4$ alkyl-substituted cyclohexyl, phenyl, $C_1$-$C_4$ alkyl-substituted phenyl, methylenebis(cyclohexyl), and $C_1$-$C_4$ alkyl-substituted methylenebis(cyclohexyl), a and b individually are 0 or 1, and Y is $C_1$-$C_{10}$ alkyl, and optionally other components.

The curable epoxy resin compositions and cured products described herein may be useful as structural and electrical laminates, coatings, castings, structural components (particularly for aerospace industries), and as circuit boards and the like for the electronics industry, among other applications. The curable epoxy resin compositions disclosed herein may also be used in electrical varnishes, encapsulants, semiconductors, general molding powders, filament wound pipes and fittings, filament wound pressure vessels, low and high pressure pipes and fittings, low and high pressure vessels, storage tanks, wind turbine blades, automotive structural parts, aerospace structural parts, oil and gas buoyance modules, rigs, well plugs, cure-in-place-pipe (CIPP), structural bonding adhesives and laminates, a composite liner, liners for pumps, corrosion resistant coatings, and other suitable epoxy containing products.

The curable epoxy resin composition may be used to form composite materials based on reinforced fiber substrates. The reinforced fiber substrate may preferably be one or more layers of fiberglass material. Contacting the reinforcing fiber substrate with the epoxy resin system may preferably comprise an application process selected from the group consisting of hand lamination, an infusion process, filament winding, pultrusion, resin transfer molding, fiber pre-impregnation processes, and combinations thereof.

Preferable fiber substrates include organic or inorganic fibers, natural fibers or synthetic fibers, and may be present in the form of wovens or non-crimp fabrics, nonwovens webs or mats, and also in the form of fiber stands (rovings), or staple fiber formed of continuous or discontinuous fiber such as fiber glass, carbon fiber, carbon nanotubes, nano composite fibers, polyaramide fibers such as those sold under the trade name KEVLAR®, Poly(p-phenylene benzobisoxazole) fiber such as those sold under the trade name ZYLON®, ultrahigh molecular weight polyethylene fibers such as those sold under the trade name SPECTRA®, high and low density polyethylene fibers, polypropylene fibers, nylon fibers, cellulose fibers, natural fibers, biodegradable fibers and combinations thereof.

Preferably, these fibers (woven or non-woven) can be coated with the solvent or solvent free epoxy resin mixture by the standard impregnating methods, in particular for filament winding (FW), pultrusion, sheet molding compound, bulk molding compound autoclave molding, resin infusion, vacuum assisted resin transfer molding (VARTM), resin transfer molding (RTM), wet/hand lay-up, vacuum bagging, resin impregnation, prepreg, fiber impregnation, compression molding (CM), brushing, spraying, or dipping, casting, injection molding or combination thereof.

The present disclosure also includes articles of manufacture comprising an amine-epoxy composition as described above. Such articles may include, but are not limited to, an adhesive, a coating, a primer, a sealant, a curing compound, a construction product, a flooring product, a composite product, laminate, potting compounds, grouts, fillers, cementitious grouts, or self-leveling flooring. Additional components or additives may be used together with the compositions of the present disclosure to produce articles of manufacture. Further, such coatings, primers, sealants, curing compounds or grouts may be applied to metal or cementitious substrates.

The present invention is also directed to the use of mono-alkylated diamines of formula (I)

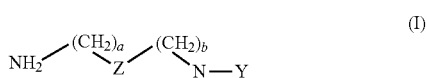

wherein Z is selected from the group consisting of cyclohexyl, phenyl and methylenebis(cyclohexyl), a and b individually are 0 or 1, and Y is $C_1$-$C_{10}$ alkyl, or their preferred embodiments as described previously as hardeners for epoxy resins.

EXAMPLES

Examples 1-9 are methods of synthesizing curing agents of the present invention.

Example 1. Synthesis of Sec-Butylated Isophoronediamine 0.5/1.0 Molar Ratio (MEK:IPD)

The synthesis of N-sec-butyl isophoronediamine is a one-batch process. 990.3 g of isophoronediamine (5.815 mol) and 209.7 g of 2-butanone (2.908 mol) were charged to a 2-liter autoclave batch reactor, with 7.43 g of 5% sulfided platinum on carbon catalyst. The reactor was sealed and subsequently purged with nitrogen and then hydrogen to remove any air from the reactor. The reactor was pressurized to 27.2 atm (400 psig) with hydrogen and the reactor was heated to 120-140° C. When the rate of hydrogen uptake slowed, the pressure was increased to 54.4 atm (800 psig). The hydrogenation process continued until the rate of hydrogen uptake fell below 0.0007 MPa/min (0.1 psi/min). The reactor was cooled to ambient temperature and depressurized, and the reaction product was filtered to remove the catalyst. Water was removed using a rotary evaporator operating under 30 mm Hg vacuum and temperatures up to 100° C. The resulting reaction product was sec-butylated isophoronediamine with the composition determined by gas chromatography shown in the table below and represented by the structure below. Alternatively, the same product was obtained via the same procedure as above using 5% palladium on carbon catalyst with minimal difference in conversion.

Example 2. Synthesis of Sec-Butylated Isophoronediamine 1.0/1.0 Molar Ratio (MEK:IPD)

The synthesis of N-sec-butyl isophoronediamine is a one-batch process. 843.0 g of isophoronediamine (4.950 mol) and 357.0 g of 2-butanone (4.950 mol) were charged to a 2-liter autoclave batch reactor, with 6.32 g of 5% sulfided platinum on carbon catalyst. The reactor was sealed and subsequently purged with nitrogen and then hydrogen to remove any air from the reactor. The reactor was pressurized to 27.2 atm (400 psig) with hydrogen and the reactor was heated to 120-140° C. When the rate of hydrogen uptake slowed, the pressure was increased to 54.4 atm (800 psig). The hydrogenation process continued until the rate of hydrogen uptake fell below 0.0007 MPa/min (0.1 psi/min). The reactor was cooled to ambient temperature and depressurized, and the reaction product was filtered to remove the catalyst. Water was removed using a rotary evaporator operating under 30 mm Hg vacuum and temperatures up to 100° C. The resulting reaction product was sec-butylated isophoronediamine with the composition determined by gas chromatography shown in the table below and represented by the structures below. Alternatively, the same product was obtained via the same procedure as above using 5% palladium on carbon catalyst with minimal difference in conversion. For this case, a NMR spectrum of the product was performed and the ratio of major to minor mono alkylated IPD was 80:20, while the selectivity of total monoalkylated IPD was about 90%.

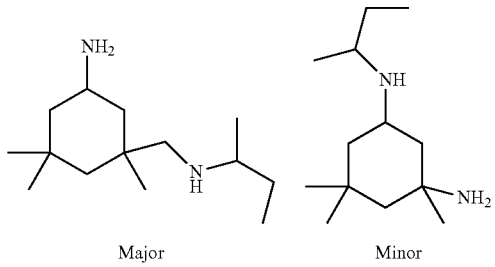

Major      Minor

Composition of Products:

| Catalyst Type<br>Component | MEK:IPD<br>(0.5:1)<br>5% Pd/C<br>(Example 1)<br>% | MEK:IPD<br>(0.5:1)<br>5% Pt(S)/C<br>(Example 1)<br>% | MEK:IPD<br>(1:1)<br>5% Pd/C<br>(Example 2)<br>% | MEK:IPD<br>(1:1)<br>5% Pt(S)/C<br>(Example 2)<br>% |
|---|---|---|---|---|
| IPD | 43.6 | 44.5 | 5.3 | 9.6 |
| N-secbutyl-IPD | 54.5 | 53.3 | 87.1 | 80.0 |
| N,N'-disecbutyl-IPD | 2.0 | 2.3 | 7.6 | 10.4 |

Example 3. Synthesis of Cyclohexylated Isophoronediamine 0.5/1.0 Molar Ratio (CHONE:IPD)

The synthesis of N-cyclohexyl isophoronediamine is a one-batch process. 465.8 g of isophoronediamine (2.74 mol) and 134.2 g of cyclohexanone (1.37 mol) were charged to a 1-liter autoclave batch reactor, with 7.0 g of 5% sulfided platinum on carbon catalyst. The reactor was sealed and subsequently purged with nitrogen and then hydrogen to remove any air from the reactor. The reactor was pressurized to 27.2 atm (400 psig) with hydrogen and the reactor was heated to 120° C. When the rate of hydrogen uptake slowed, the pressure was increased to 54.4 atm (800 psig). The hydrogenation process continued until the rate of hydrogen uptake fell below 0.0007 MPa/min (0.1 psi/min). The reactor was cooled to ambient temperature and depressurized, and the reaction product was filtered to remove the catalyst. Water was removed using a rotary evaporator operating under 30 mm Hg vacuum and temperatures up to 100° C. The resulting reaction product was cyclohexylated isophoronediamine with the composition determined by gas chromatography shown in the table below.

Example 4. Synthesis of Cyclohexylated Isophoronediamine 1.0/1.0 Molar Ratio (CHONE:IPD)

The synthesis of N-cyclohexyl isophoronediamine is a one-batch process. 348.9 g of isophoronediamine (2.05 mol) and 201.1 g of cyclohexanone (2.05 mol) were charged to a 1-liter autoclave batch reactor, with 5.2 g of 5% palladium on carbon catalyst. The reactor was sealed and subsequently purged with nitrogen and then hydrogen to remove any air from the reactor. The reactor was pressurized to 27.2 atm (400 psig) with hydrogen and the reactor was heated to 120° C. When the rate of hydrogen uptake slowed, the pressure was increased to 54.4 atm (800 psig). The hydrogenation process continued until the rate of hydrogen uptake fell below 0.0007 MPa/min (0.1 psi/min). The reactor was cooled to ambient temperature and depressurized, and the reaction product was filtered to remove the catalyst. Water was removed using a rotary evaporator operating under 30 mm Hg vacuum and temperatures up to 100° C. The resulting reaction product was cyclohexylated isophoronediamine with the composition determined by gas chromatography shown in the table below.

Composition of Products:

| Component | CHONE:IPD (0.5:1) (Example 3) % | CHONE:IPD (1:1) (Example 4) % |
|---|---|---|
| IPD | 41.85 | 4.2 |
| N-cyclohexyl-IPD | 55.5 | 88.6 |
| N,N'-dicyclohexyl-IPD | 2.6 | 8.7 |

Example 5. Synthesis of Trimethylcyclohexylated Isophoronediamine 0.5/1.0 Molar Ratio (Isophorone:IPD)

The synthesis of N-trimethylcyclohexyl isophoronediamine is a one-batch process. 170.8 g of isophoronediamine (1.00 mol) and 69.2 g of isophorone (0.50 mol) were combined with 240 g of tetrahydrofuran and charged to a 1-liter autoclave batch reactor, with 7.2 g of 5% palladium on carbon catalyst. The reactor was sealed and subsequently purged with nitrogen and then hydrogen to remove any air from the reactor. The reactor was pressurized to 27.2 atm (400 psig) with hydrogen and the reactor was heated to 160° C. When the rate of hydrogen uptake slowed, the pressure was increased to 54.4 atm (800 psig). The hydrogenation process continued until the rate of hydrogen uptake fell below 0.0007 MPa/min (0.1 psi/min). The reactor was cooled to ambient temperature and depressurized, and the reaction product was filtered to remove the catalyst. Water and tetrahydrofuran were removed using a rotary evaporator operating down to 30 mm Hg vacuum and temperatures up to 100° C. The resulting reaction product was trimethylcyclohexylated isophoronediamine with the composition determined by gas chromatography shown in the table below.

Example 6. Synthesis of Trimethylcyclohexylated Isophoronediamine 1.0/1.0 Molar Ratio (Isophorone:IPD)

The synthesis of N-trimethylcyclohexyl isophoronediamine is a one-batch process. 132.5 g of isophoronediamine (0.78 mol) and 107.5 g of isophorone (0.78 mol) were combined with 240 g of tetrahydrofuran and charged to a 1-liter autoclave batch reactor, with 3.6 g of 5% palladium on carbon catalyst. The reactor was sealed and subsequently purged with nitrogen and then hydrogen to remove any air from the reactor. The reactor was pressurized to 27.2 atm (400 psig) with hydrogen and the reactor was heated to 160° C. When the rate of hydrogen uptake slowed, the pressure was increased to 54.4 atm (800 psig). The hydrogenation process continued until the rate of hydrogen uptake fell below 0.0007 MPa/min (0.1 psi/min). The reactor was cooled to ambient temperature and depressurized, and the reaction product was filtered to remove the catalyst. Water and tetrahydrofuran were removed using a rotary evaporator operating down to 30 mm Hg vacuum and temperatures up to 100° C. The resulting reaction product was trimethylcyclohexylated isophoronediamine with the composition determined by gas chromatography shown in the table below.

Composition of Products:

| Component | Isophorone:IPD (0.5:1) (Example 5) % | Isophorone:IPD (1:1) (Example 6) % |
|---|---|---|
| IPD | 33.9 | 3.7 |
| N-(trimethylcyclohexyl)-IPD | 65.1 | 84.6 |
| N,N'-di(trimethylcyclohexyl)-IPD | 0.9 | 11.2 |

Example 7. Synthesis of Sec-Butylated 3,3'-dimethyl-4,4'-diaminodicyclohexylmethane 1.0/1.0 Molar Ratio (MEK:DMPACM)

The synthesis of N-sec-butyl 3,3'-dimethyl-4,4'-diaminodicyclohexylmethane is a one-batch process. 460.7 g of 3,3'-dimethyl-4,4'-diaminodicyclohexylmethane (1.93 mol) and 139.3 g of 2-butanone (1.93 mol) were charged to a 1-liter autoclave batch reactor, with 3.46 g of 5% sulfided platinum on carbon catalyst. The reactor was sealed and subsequently purged with nitrogen and then hydrogen to remove any air from the reactor. The reactor was pressurized to 34.0 atm (500 psig) with hydrogen and the reactor was heated to 160° C. When the rate of hydrogen uptake slowed, the pressure was increased to 54.4 atm (800 psig). The hydrogenation process continued until the rate of hydrogen uptake fell below 0.0007 MPa/min (0.1 psi/min). The reactor was cooled to ambient temperature and depressurized, and the reaction product was filtered to remove the catalyst. Water was removed using a rotary evaporator operating under 40 mm Hg vacuum and temperatures up to 100° C. The resulting reaction product was sec-butylated 3,3'-dimethyl-4,4'-diaminodicyclohexylmethane with the composition determined by gas chromatography shown in the table below and represented by the structure below.

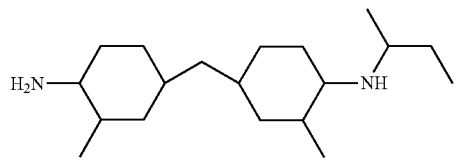

Composition of Products:

| Component | MEK:DMPACM (1:1) (Example 7) % |
|---|---|
| DMPACM | 18.2 |
| N-secbutyl-DMPACM | 61.5 |
| N,N'-disecbutyl-DMPACM | 20.2 |

Example 8. Synthesis of Sec-Butylated m-Xylylenediamine 1.0/1.0 Molar Ratio (MEK:MXDA)

The synthesis of N-sec-butyl m-xylylenediamine is a one-batch process. 392.3 g of m-xylylenediamine (2.88 mol) and 207.7 g of 2-butanone (2.88 mol) were charged to a 1-liter autoclave batch reactor, with 2.94 g of 5% sulfided platinum on carbon catalyst. The reactor was sealed and subsequently purged with nitrogen and then hydrogen to remove any air from the reactor. The reactor was pressurized to 34.0 atm (500 psig) with hydrogen and the reactor was heated to 120° C. When the rate of hydrogen uptake slowed, the pressure was increased to 54.4 atm (800 psig). The hydrogenation process continued until the rate of hydrogen uptake fell below 0.0007 MPa/min (0.1 psi/min). The reactor was cooled to ambient temperature and depressurized, and the reaction product was filtered to remove the catalyst. Water was removed using a rotary evaporator operating under 40 mm Hg vacuum and temperatures up to 100° C. The resulting reaction product was sec-butylated m-xylylenediamine with the composition determined by gas chromatography shown in the table below and represented by the structure below.

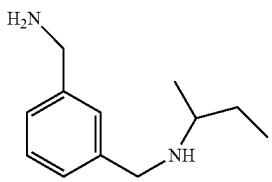

Composition of Products:

| Component | MEK:MXDA (1:1) (Example 8) % |
|---|---|
| MXDA | 8.9 |
| N-secbutyl-MXDA | 73.5 |
| N,N'-disecbutyl-MXDA | 17.3 |

Example 9. Synthesis of Sec-Butylated 4,4'-diaminodicyclohexylmethane 1.0/1.0 Molar Ratio (MEK:PACM)

The synthesis of N-sec-butyl 4,4'-diaminodicyclohexylmethane is a one-batch process. 446.6 g of 4,4'-diaminodicyclohexylmethane (2.13 mol) and 153.4 g of 2-butanone (2.13 mol) were charged to a 1-liter autoclave batch reactor, with 3.40 g of 5% sulfided platinum on carbon catalyst. The reactor was sealed and subsequently purged with nitrogen and then hydrogen to remove any air from the reactor. The reactor was pressurized to 27.2 atm (400 psig) with hydrogen and the reactor was heated to 140° C. When the rate of hydrogen uptake slowed, the pressure was increased to 54.4 atm (800 psig). The hydrogenation process continued until the rate of hydrogen uptake fell below 0.0007 MPa/min (0.1 psi/min). The reactor was cooled to ambient temperature and depressurized, and the reaction product was filtered to remove the catalyst. Water was removed using a rotary evaporator operating under 40 mm Hg vacuum and temperatures up to 100° C. The resulting reaction was product was sec-butylated 4,4'-diaminodicyclohexylmethane with the composition determined by gas chromatography shown in the table below and represented by the structure below.

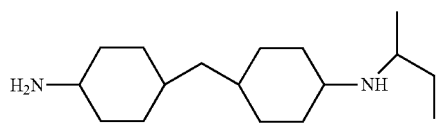 [SMILES: CCC(C)NC1CCC(CC2CCC(N)CC2)CC1]

Composition of Products:

| Component | MEK:PACM (1:1) (Example 9) % |
|---|---|
| PACM | 22.1 |
| N-secbutyl-PACM | 54.3 |
| N,N'-disecbutyl-PACM | 23.7 |

These Examples are provided to demonstrate certain aspects of the invention and shall not limit the scope of the claims appended hereto.

Example 10. This Example Describes the Preparation and Testing of Alkylated IPD Curing Agents with Epoxy Resin

TABLE 1

| | Formulations | | | |
|---|---|---|---|---|
| Properties | 1 IPD | 2 Mono-alkylated IPD:MEK (1:0.5) | 3 Mono-alkylated IPD IPD:MEK (1:1) | 4 Di-alkylated IPD |
| Phr (EEW 180) | 24 | 30 | 39 | 74 |
| Neat viscosity [mPa*s] @ 25° C. | 15 | 20 | 20 | — |
| Mix viscosity cPs [min] @ 40° C. | 319 | 313 | 206 | — |
| Time to 1,000 viscosity cPs [min] @ 40° C. | 36 | 66 | 90 | Uncured |
| Gel time (mins) 25° C. 150 gms | 122 | 236 | 502 | Uncured |
| Tg [° C.] | 155 | 150 | 130 | Uncured |

The comparison between commercial cycloaliphatic amines like IPD (formulation 1) with mono-alkylated and di-alkylated products (formulations 2-4) of this invention are reported in Table 1. The neat viscosity of the alkylated isophoronediamine (AIPD) products remains very low. It is desired to have a low viscosity of the curing agent that helps to reduce the overall epoxy formulation viscosity for composite applications. The gel time of the alkylated isophoronediamine (AIPD) product with IPD:MEK ratio (1:0.5) doubled and IPD:MEK ratio (1:1) increased almost five times at 25° C. This is adequate time and viscosity to process larger and thicker composite parts with uniformity.

The alkylated isophoronediamine (AIPD) products reactivity with epoxy resin maintained the physical, thermal and chemical properties desired for composite applications.

The curing agents were used to mix with epoxy resin (epoxy equivalent weight (EEW) 180) at varied stoichiometric ratios shown in Table 1. The liquid epoxy resin (LER) (EEW 180) EPON® 826. EPON® is a registered trademark of Hexion Specialty Chemicals, Inc.

The viscosity of all formulations shown in Table 1 were measured at 25° C. & 40° C. using Brookfield viscometer RV with spindle number 27. 12 grams of epoxy resin composition were used to measure the viscosity.

A TECHNE® gel timer was used to measure the gel time of all the formulations shown in Table 1. Sometime in industry gel time is also equivalent as a potlife. The one end of the metal rod was connected to the TECHNE® gel timer and another end with the 1" diameter dish. The epoxy resin and curing agents were preheated separately at 25° C. A total of 150 grams of mixture (epoxy resin and curing agents) was mixed for 3-5 minutes. The 1" diameter dish was immersed into the beaker content mixture and gel time was turned on immediately to obtain an accurate reading.

The results for formulations 1-4 are reported in Table 1. Formulation 1 is used as a control sample, according to the present disclosure, and provides an initial mix viscosity of ~319 cPs. Formulations 2 and 3 give an initial mix viscosity of ~313 cPs and 206 cPs, respectively. Lower mix viscosity enhances the fiber wetting in the thick composite section under pressure due to improved resin penetration between the fabric layers. Formulation 1 provides a Tg in the range of 140° C.-155° C. and formulations 2 and 3 provide a Tg in the range of 130° C.-150° C. The alkylated isophoronediamine (AIPD) maintained the Tg range to non-alkylated IPD while improving the gel time 2-5 times of the control formulation (IPD).

TABLE 2

| Properties | Formulations | | | |
|---|---|---|---|---|
| | 5 IPD:CHONE (1:0.5) | 6 IPD:CHONE (1:1) | 7 IPD:ISO (1:0.5) | 8 IPD:ISO (1:1) |
| Phr (EEW 180) | 34 | 44 | 42 | 60 |
| Neat viscosity [mPa*s] @ 25° C. | 28 | 80 | 35 | 176 |
| Mix viscosity cPs [min] @ 40° C. | 400 | 500 | 300 | 400 |
| Time to 1,000 viscosity cPs [min] @ 40° C. | 75 | 92 | 83 | 104 |
| Tg [° C.] (Iso thermal cure) | 130 | 120 | 135 | 105 |

The handling properties results for the alkylation IPD with CHONE and Isophorone at two different ratios are reported in Table 2. (formulations 5-8). The neat viscosity of the alkylated products remains very low. It is desired to have a low viscosity of the curing agent that helps to reduce the overall epoxy formulation viscosity for composite applications. The reactivity of both alkylated products slows down significantly. This feature gives an adequate time and viscosity to process larger and thicker composite parts with uniformity.

Example 11

This example describes the testing of cured epoxy resin formulations

TABLE 3

| Properties | Formulation | | | |
|---|---|---|---|---|
| | 1 IPD | 2 IPD:MEK (1:0.5) | 3 IPD:MEK (1:1) | 4 Di-alkylated IPD |
| LER EEW-180 | 100 | 100 | 100 | 100 |
| Curing agent Phr | 24 | 30 | 39 | 74 |
| Tensile Strength(psi) | 8,489 | 6,910 | 7,738 | Uncured |
| Tensile Modulus (ksi) | 441 | 465 | 474 | Uncured |
| % Elongation at Break | 2.8 | 1.7 | 1.9 | Uncured |
| Flexural Strength (psi) | 15,556 | 17,595 | 14,965 | Uncured |
| Flexural Modulus(ksi) | 345 | 383 | 397 | Uncured |

TABLE 3-continued

| Properties | Formulation | | | |
|---|---|---|---|---|
| | 1 IPD | 2 IPD:MEK (1:0.5) | 3 IPD:MEK (1:1) | 4 Di-alkylated IPD |
| Comp. Strength (psi) | 15,167 | 13,568 | 11,107 | Uncured |
| Comp. Modulus (psi) | 251 | 296 | 267 | Uncured |

The epoxy resin and amine curatives shown in Table 3 were hand mixed at 40° C. for 3-5 minutes. Entrapped air was removed by placing the mixture in a centrifuge for 5 minutes or until the mixture was clear. The mixture was then poured into a ⅛" aluminum mold. The system in the mold was cured at 60° C. for 1 hour plus 150° C. for 2 hours. Molds were allowed to cool to room temperature before removing the cured sample. Specimens were prepared from the cast samples according to ASTM methods to perform the mechanical testing; tensile test (ASTM D638), flexural test (ASTM D790), and compressive test (ASTM D695). Additional 1"×3"×⅛" samples were prepared to perform chemical resistance testing in different reagents (Table 4).

Example 12

This example describes the testing of cured epoxy resin formulations after chemical immersion.

TABLE 4

| Properties | Formulation | | | |
|---|---|---|---|---|
| | 1 IPD | 2 IPD:MEK (1:0.5) | 3 IPD:MEK (1:1) | 4 Di-alkylated IPD |
| LER EEW-180 | 100 | 100 | 100 | 100 |
| Curing agent Phr used | 24 | 30 | 39 | 74 |
| Flexural Modulus retention after Chemical immersion | | | | |
| | Flexural Modulus (psi) | | | |
| No exposure | 345 | 383 | 397 | Uncured |
| After 30 days in DI water @ 40° C. (psi) | 372 | 406 | 340 | Uncured |
| After 30 days in MeOH @ 40° C. (psi) | 264 | NP | 214 | Uncured |
| After 30 days in NH₄OH @ 40° C. (psi) | 369 | NP | 326 | Uncured |
| After 30 days in 10% HNO₃ @ 40° C. (psi) | 384 | NP | 325 | Uncured |

*NP—Not perform

The neat cast panels for formulations 1-3 were prepared using the process described in Example 11. The flexural specimens (½"×3"×⅛") were machined according to ASTM D790. The specimens were immersed into different reagents for 30 days @ 40° C. to understand the flexural modulus retention before and after immersion. The reagents used were; DI water, methanol, 10% ammonium hydroxide, and 10% nitric acid. The flexural modulus of the formulation 2 & 3 were retained in most of the reagents

Example 13

This example describes the processing and thermal properties of alkylation products of different cycloaliphatic amines.

TABLE 5

| | Formulations | | | | | | | |
|---|---|---|---|---|---|---|---|---|
| Properties | 1 IPD | 3 IPD:MEK (1:1) | 9 MXDA | 10 MXDA:MEK (1:1) | 11 PACM | 12 PACM:MEK (1:1) | 13 DM-PACM | 14 DM-PACM:MEK (1:1) |
| Phr (EEW 180) | 24 | 39 | 19 | 36 | 29 | 50 | 33 | 56 |
| Neat viscosity [mPa*s] @ 25° C. | 15 | 20 | 10 | 10 | 80 | 68 | 90 | 100 |
| Mix viscosity cPs [min] @ 40° C. | 319 | 206 | 330 | 200 | 515 | 250 | 485 | 325 |
| Time to 1,000 viscosity cPs [min] @ 40° C. | 36 | 90 | 44 | 119 | 44 | 128 | 76 | 195 |
| Gel time (mins) 25° C. 150 gms | 122 | 502 | 87 | 275 | 210 | 596 | 320 | >500 |
| Tg [° C.] | 155 | 130 | 120 | 86 | 155 | 119 | 157 | 121 |

The comparison between commercial amines like IPD, MXDA, PACM & DMPACM (formulation 1,9,11,13) and the mono alkylation of these products are in (formulations 3,10,12,14) of this invention are reported in Table 5. The neat viscosity of the alkylated products remains very low. It is desired to have a low viscosity of the curing agent that helps to reduce the overall epoxy formulation viscosity for composite applications. The gel time of the alkylated products (formulations 3, 10, 12 & 14) increased almost five times at 25° C. This is adequate time and viscosity to process larger and thicker composite parts with uniformity.

What is claimed is:

1. An epoxy resin system comprising an epoxy resin component and a mono-alkylated diamine curing agent selected from the group consisting of
    i) mono-alkylated isophoronediamine represented by the structure (III):

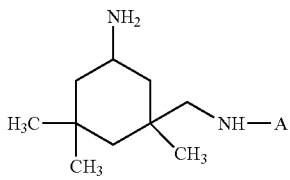

(III)

wherein A is a $C_1$-$C_{10}$ alkyl;

ii) mono-alkylated methylcyclohexyldiamine represented by the structure (V):

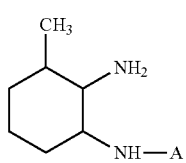

(V)

wherein A is a $C_1$-$C_{10}$ alkyl;

iii) mono-alkylated methylcyclohexyldiamine represented by the structure (VI):

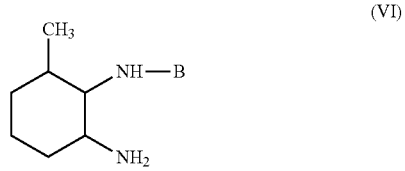

(VI)

wherein B is a $C_1$-$C_{10}$ alkyl; and iv) mono-alkylated cyclohexyldiamine represented by the structure (VII):

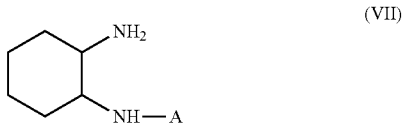

(VII)

wherein A is a $C_1$-$C_{10}$ alkyl.

2. The epoxy resin system of claim 1, wherein the epoxy resin system comprises at least 20% by weight of the mono-alkylated diamine, based on the total weight of all curing agents present in the system.

3. The epoxy resin system of claim 1, wherein the epoxy resin system further comprises one or more amine co-curing agents selected from the group consisting of primary amines and secondary amines.

4. The epoxy resin system of claim 3, wherein the one or more amine co-curing agents comprise one or more amine compounds selected from the group consisting of polyether amines, polyether polyamines, saturated aliphatic ring diamines, linear aliphatic amines, cycloaliphatic amines, polycycloaliphatic amines and aromatic amines.

5. The epoxy resin system of claim 1, wherein the epoxy resin component comprises one or more glycidyl ethers selected from the group consisting of: diglycidyl ether of resorcinol, diglycidyl ether of hydroquinone, diglycidyl ether of bis-(4-hydroxy-3,5-difluorophenyl)-methane, diglycidyl ether of 1,1-bis-(4-hydroxyphenyl)-ethane, diglycidyl ether of 2,2-bis-(4-hydroxy-3-methylphenyl)-propane, diglycidyl ether of 2,2-bis-(4-hydroxy-3,5-dichlorophenyl)

propane, diglycidyl ether of 2,2-bis-(4-hydroxyphenyl)-propane, and diglycidyl ether of bis-(4-hydroxyphenyl)-methane.

6. The epoxy resin system of claim 1, wherein the epoxy resin component comprises at least one diglycidyl ether of a dihydric phenol of the following structure (XIV):

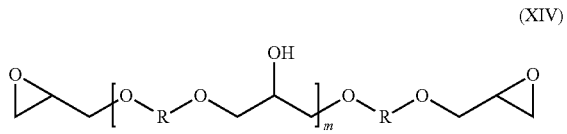

(XIV)

wherein m is 0 to 25 and R is a divalent hydrocarbon radical.

7. The epoxy resin system of claim 1, wherein the epoxy resin component comprises one or more members selected from the group consisting of: bis(3,4-epoxycyclohexylmethyl)oxalate, bis(3,4-epoxycyclohexylmethyl)adipate, bis(3,4-epoxy-6-methylcyclohexylmethyl)adipate, vinylcyclohexene diepoxides, limonene diepoxide, bis(3,4-epoxycyclohexylmethyl)pimelate, dicyclopentadiene diepoxide, 3,3-epoxycyclohexylmethyl-3,4-epoxycyclohexane carboxylate, 3,4-epoxycyclohexylmethyl-3,4-epoxycyclohexane carboxylate, 3,3-epoxy-1-methylcyclohexyl-methyl-3,4-epoxy-1-methylcyclohexane carboxylate, 6-methyl-3,4-epoxycyclohexylmethylmethyl-6-methyl-3,4-epoxycyclohexane carboxylate, and 3,4-epoxy-2-methylcyclohexyl-methyl-3,4-epoxy-3-methylcyclohexane carboxylate, and combinations thereof.

8. A method for producing the epoxy resin system according to claim 1, comprising combining the epoxy resin component, the mono-alkylated diamine, and optionally other components.

9. An article of manufacture comprising the epoxy resin system as set forth in claim 1, wherein the article is a structural or electrical laminate, coating, casting, structural component, circuit board, electrical varnish, encapsulant, semiconductor, general molding powder, filament wound pipe and fitting, filament wound pressure vessel, low and high pressure pipe and fitting, low and high pressure vessel, storage tank, wind turbine blade, automotive structural part, aerospace structural part, oil and gas buoyance module, rig, well plug, cure-in-place-pipe (CIPP), structural bonding adhesive and laminate, a composite liner, liner for pumps, corrosion resistant coating or composite material based on reinforced fiber substrates.

10. An epoxy resin system comprising an epoxy resin component and a mono-alkylated diamine curing agent represented by the structure (VIII):

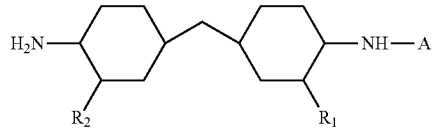

(VIII)

wherein each of $R_1$ and $R_2$ is H or $CH_3$; and wherein A is a $C_1$-$C_{10}$ alkyl.

11. The epoxy resin system of claim 10 wherein the mono-alkylated diamine is selected from the group consisting of i) mono-alkylated 4,4'-methylenebis(cyclohexylamine) represented by the structure (IX):

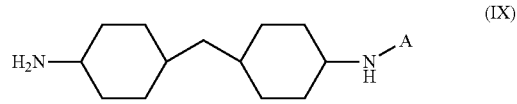

(IX)

wherein A is a $C_1$-$C_{10}$ alkyl; and
ii) mono-alkylated 2,2'-dimethyl-4,4'-methylenebis(cyclohexylamine) represented by the structure (X):

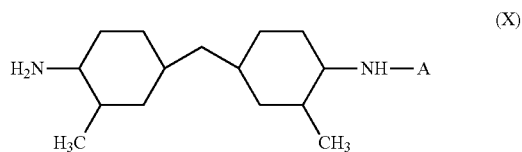

(X)

wherein A is a $C_1$-$C_{10}$, alkyl.

12. The epoxy resin system of claim 11, wherein the epoxy resin system comprises at least 20% by weight of the mono-alkylated diamine, based on the total weight of all curing agents present in the system.

13. The epoxy resin system of claim 11, wherein the epoxy resin system further comprises one or more amine co-curing agents selected from the group consisting of primary amines and secondary amines.

14. The epoxy resin system of claim 13, wherein the one or more amine co-curing agents comprise one or more amine compounds selected from the group consisting of polyether amines, polyether polyamines, saturated aliphatic ring diamines, linear aliphatic amines, cycloaliphatic amines, polycycloaliphatic amines and aromatic amines.

15. The epoxy resin system of claim 11, wherein the epoxy resin component comprises one or more glycidyl ethers selected from the group consisting of: diglycidyl ether of resorcinol, diglycidyl ether of hydroquinone, diglycidyl ether of bis-(4-hydroxy-3,5-difluorophenyl)-methane, diglycidyl ether of 1,1-bis-(4-hydroxyphenyl)-ethane, diglycidyl ether of 2,2-bis-(4-hydroxy-3-methylphenyl)-propane, diglycidyl ether of 2,2-bis-(4-hydroxy-3,5-dichlorophenyl)propane, diglycidyl ether of 2,2-bis-(4-hydroxyphenyl)-propane, and diglycidyl ether of bis-(4-hydroxyphenyl)-methane.

16. The epoxy resin system of claim 11, wherein the epoxy resin component comprises at least one diglycidyl ether of a dihydric phenol of the following structure (XIV):

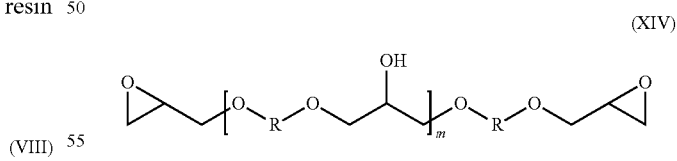

(XIV)

wherein m is 0 to 25 and R is a divalent hydrocarbon radical.

17. The epoxy resin system of claim 11, wherein the epoxy resin component comprises one or more members selected from the group consisting of: bis(3,4-epoxycyclohexylmethyl)oxalate, bis(3,4-epoxycyclohexylmethyl)adipate, bis(3,4-epoxy-6-methylcyclohexylmethyl)adipate, vinylcyclohexene diepoxides, limonene diepoxide, bis(3,4-epoxycyclohexylmethyl)pimelate, dicyclopentadiene diepoxide, 3,3-epoxycyclohexylmethyl-3,4-epoxycyclohexane carboxylate, 3,4-epoxycyclohexylmethyl-3,4-epoxycyclohexane carboxylate, 3,3-epoxy-1-methylcyclohexyl-methyl- 3,4-epoxy-1-methylcyclohexane carboxylate, 6-methyl-3,4-epoxycyclohexylmethylmethyl-6-methyl-3,4-epoxycyclohexane carboxylate, and 3,4-epoxy-2-methylcyclohexyl-methyl-3,4-epoxy-3-methylcyclohexane carboxylate.

18. An article of manufacture comprising the epoxy resin system as set forth in claim 11, wherein the article is a structural or electrical laminate, coating, casting, structural component, circuit board, electrical varnish, encapsulant, semiconductor, general molding powder, filament wound pipe and fitting, filament wound pressure vessel, low and high pressure pipe and fitting, low and high pressure vessel, storage tank, wind turbine blade, automotive structural part, aerospace structural part, oil and gas buoyance module, rig, well plug, cure-in-place-pipe (CIPP), structural bonding adhesive and laminate, a composite liner, liner for pumps, corrosion resistant coating or composite material based on reinforced fiber substrates.

19. A method for producing the epoxy resin system according to claim 10, comprising combining the epoxy resin component, the mono-alkylated diamine, and optionally other components.

\* \* \* \* \*